US006785081B2

(12) United States Patent
Chapin et al.

(10) Patent No.: US 6,785,081 B2
(45) Date of Patent: Aug. 31, 2004

(54) FLY HEIGHT DETECTOR (75) Inventors: Mark A. Chapin, Boulder, CO (US); Serge J. Fayeulle, Longmont, CO (US); Michael D. Mundt, Longmont, CO (US); Gary E. Bement, Frederick, CO (US); Paul W. Smith, Niwot, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 196 days.

(21) Appl. No.: 09/975,294

(22) Filed: Oct. 11, 2001

(65) Prior Publication Data
US 2002/0071196 A1 Jun. 13, 2002

Related U.S. Application Data
(60) Provisional application No. 60/245,446, filed on Nov. 2, 2000.

(51) Int. Cl.[7] .................................. G11B 21/02
(52) U.S. Cl. .......................................... 360/75
(58) Field of Search ................... 360/75, 31, 294.7, 360/25, 52

(56) References Cited

U.S. PATENT DOCUMENTS

| 4,593,368 | A | | 6/1986 | Fridge et al. | |
|---|---|---|---|---|---|
| 4,681,447 | A | | 7/1987 | Davidson | |
| 4,777,544 | A | * | 10/1988 | Brown et al. | 360/75 |
| 4,866,553 | A | | 9/1989 | Kubo et al. | |
| 5,218,424 | A | | 6/1993 | Sommargren | |
| 5,377,058 | A | * | 12/1994 | Good et al. | 360/75 |
| 5,410,402 | A | | 4/1995 | Li et al. | |
| 5,453,831 | A | | 9/1995 | Li et al. | |
| 5,473,431 | A | | 12/1995 | Hollars et al. | |
| 5,488,857 | A | | 2/1996 | Homma et al. | |
| 5,495,767 | A | | 3/1996 | Wang et al. | |
| 5,552,884 | A | | 9/1996 | Li et al. | |
| 5,638,207 | A | | 6/1997 | Fukuzawa et al. | |
| 5,673,161 | A | | 9/1997 | Yanagisawa et al. | |
| 5,805,284 | A | * | 9/1998 | Lacey | 356/507 |
| 5,815,350 | A | | 9/1998 | Kennedy et al. | |
| 5,828,536 | A | | 10/1998 | Morita | |
| 5,880,587 | A | | 3/1999 | Annis et al. | |
| 5,883,715 | A | | 3/1999 | Steinlechner et al. | |
| 5,892,635 | A | | 4/1999 | Morita | |
| 5,898,553 | A | | 4/1999 | Oyanagi et al. | |
| 6,008,640 | A | | 12/1999 | Tan et al. | |
| 6,249,393 | B1 | * | 6/2001 | Billings et al. | 360/31 |
| 6,271,924 | B1 | | 8/2001 | Ngoi et al. | |
| 6,359,759 | B1 | * | 3/2002 | Congdon et al. | 360/294.7 |
| 6,411,458 | B1 | * | 6/2002 | Billings et al. | 360/75 |
| 6,452,735 | B1 | * | 9/2002 | Egan et al. | 360/31 |
| 6,459,539 | B1 | * | 10/2002 | Carlson et al. | 360/31 |
| 6,473,259 | B1 | * | 10/2002 | Kuo et al. | 360/75 |
| 6,501,606 | B2 | * | 12/2002 | Boutaghou et al. | 360/25 |
| 6,529,342 | B1 | * | 3/2003 | Feng et al. | 360/75 |
| 6,570,730 | B1 | * | 5/2003 | Lewis et al. | 360/75 |
| 6,624,892 | B1 | * | 9/2003 | Johnston | 356/507 |

* cited by examiner

Primary Examiner—David Hudspeth
Assistant Examiner—Fred F. Tzeng
(74) Attorney, Agent, or Firm—Jennifer M. Buenzow (57) ABSTRACT A fly height detector apparatus and associated method for detecting the fly height of a read/write head spatially disposed from a data storage surface during a data transfer operation. The fly height detector apparatus comprises a receiver circuit measuring the frequency of the read/write head; a perturbation deliverable to the gap between the read/write head and the data storage surface to invoke a dynamic response in the read/write head; and a processor circuit responsive to the receiver circuit to derive a fly height in relation to the dynamic response frequency. The processor circuit comprises a memory in which is stored a numerical model describing a functional interrelationship between the fly height and the read/write head frequency.

21 Claims, 7 Drawing Sheets

FIG. 8

FLY HEIGHT DETECTOR

CROSS REFERENCE TO RELATED APPLICATIONS

This application claims the benefit of U.S. Provisional Application No. 60/245,446 filed Nov. 2, 2000.

FIELD OF THE INVENTION

This invention relates generally to the field of data storage devices, and more particularly but not by way of limitation to an apparatus and associated method for determining the fly height of a read/write head spatially disposed from a data storage disc.

BACKGROUND OF THE INVENTION

Modern data storage devices such as disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage surface divided into a series of generally concentric data tracks where data is stored in the form of magnetic flux transitions.

A data transfer member such as a magnetic transducer is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance from the data storage surface as the data transfer member flies upon an air bearing comprising an aerodynamic slider portion that is lifted by air currents generated by the spinning discs.

A continuing trend in the industry is toward ever-increasing data storage capacity and processing speed while maintaining or reducing the physical size of the disc drive. Consequently, the data transfer member and supporting structures are continually being miniaturized, data storage densities are continually being increased, and data transfer member fly heights are continually being decreased. The result is an overall increased difficulty in measuring the spatial separation of the data transfer member from the data storage surface. Current optical fly height measurement solutions are not sufficiently accurate below about 0.5 microinches. However, the air bearing dynamic response to a perturbation, such as a physical protuberance, microwaviness of the disc, or patterned data, is inherently more pronounced with ever-decreasing fly height.

It has been determined that by measuring the dynamic response of the slider to a known perturbation, indirect methods can be used to extract a fly height from an empirically determined functional interrelationship between the static fly height and the dynamic response parameters of the slider and its associated structural assembly. It is to these improvements and others as exemplified by the description and appended claims that embodiments of the present invention are directed.

SUMMARY OF THE INVENTION

Embodiments of the present invention are directed to a fly height detector apparatus for detecting the fly height of a read/write head spatially disposed from a data storage surface during a data transfer operation, the data storage surface moving relative to the read/write head generating air currents supporting the read/write head at a fly height defining a gap between the read/write head and the data storage surface. The fly height detector apparatus comprises a receiver circuit measuring the frequency of the read/write head; a perturbation deliverable to the gap between the read/write head and the data storage surface to invoke a dynamic response in the read/write head; and a processor circuit responsive to the receiver circuit to derive the fly height in relation to the dynamic response frequency. The processor circuit comprises a memory in which is stored a numerical model describing a functional interrelationship between the fly height and the read/write head frequency.

In one aspect the embodiments of the present invention comprise a method for detecting a fly height of a read/write head spatially disposed from a data storage surface during a data transfer operation. The method comprises moving the data storage surface at a substantially steady speed, generating air currents supporting the read/write head at a substantially static fly height defining a gap between the read/write head and the data storage surface; presenting a perturbation in the gap between the read/write head and the data storage surface, invoking an oscillation in the read/write head; measuring the dynamic response frequency of the read/write head to the perturbation; comparing the dynamic response frequency to a numerical model of fly height in relation to read/write head frequency; and deriving the fly height of the read/write head.

In one aspect the embodiments of the present invention contemplate a disc drive comprising a rotating data storage disc generating air currents sustaining a read/write head at a fly height defining a gap therebetween during data transfer operations, and means for predicting the fly height in relation to the dynamic frequency response of the read/write head to a known perturbation introduced in the gap. In one aspect portions of the disc drive can be replicated to contemplate a bench top fly height tester apparatus.

These and various other features as well as advantages which characterize the present invention will be apparent upon reading of the following detailed description and review of the associated drawings.

BRIEF DESCRIPTION OF THE DRAWINGS

FIGS. 6A and 6B are representative scatter diagrams illustrating the relative accuracy of first order and second order inversion correlations between the fly height and dynamic response.

FIG. 8 is a diagrammatic illustration of a fly height tester constructed in accordance with an embodiment of the present invention.

DETAILED DESCRIPTION

Figure 1:
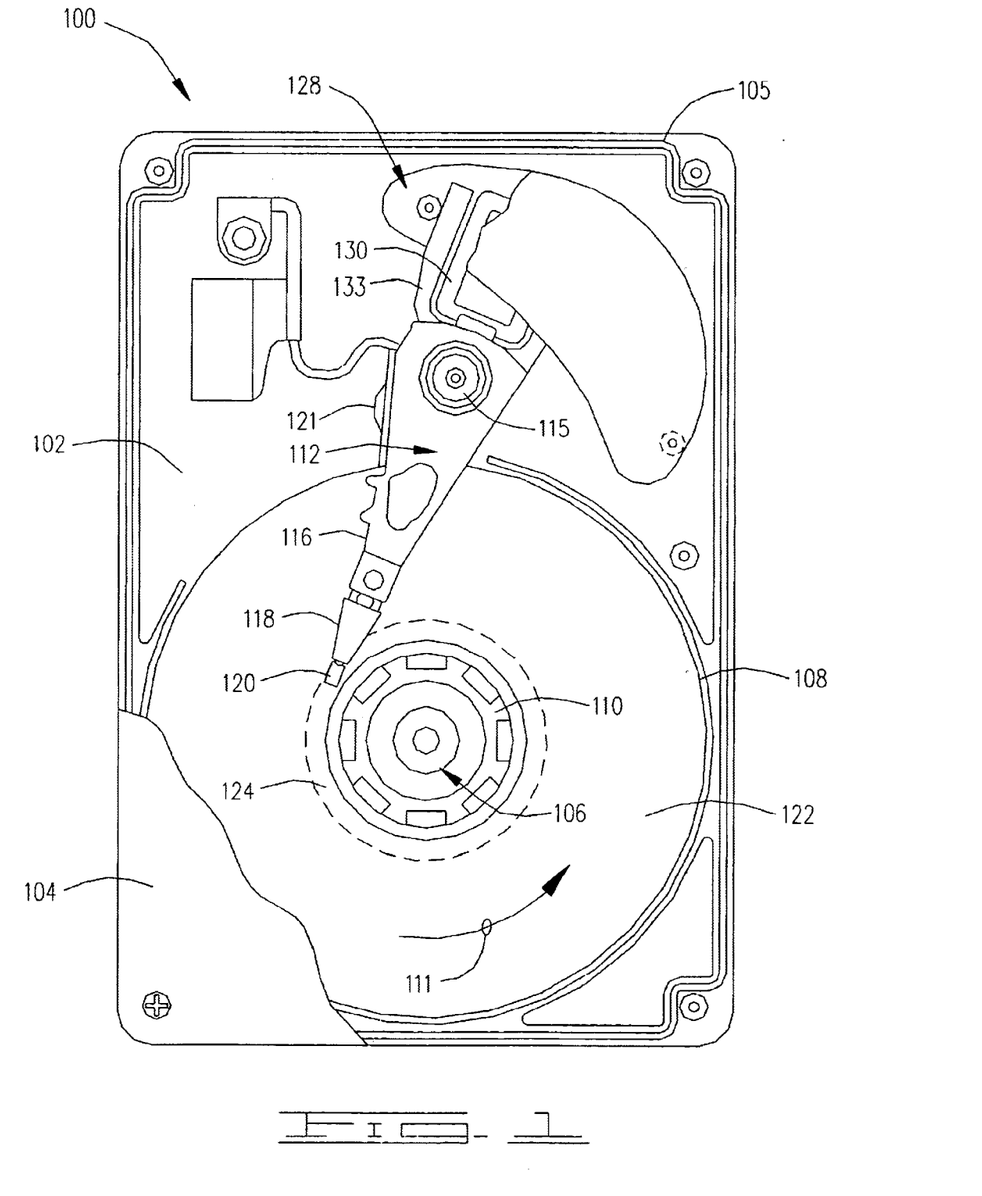
FIG. 1 is a plan view of a data storage device constructed in accordance with an embodiment of the present invention.

Referring to the drawings in general, and more particularly to FIG. 1, shown therein is a plan representation of a data storage disc drive 100 constructed in accordance with an embodiment of the present invention. The disc drive 100 includes a base 102 to which various disc drive components are mounted, and a cover 104 (partially cut-away) which together with the base 102 and a perimeter gasket 105 form an enclosure providing a sealed internal environment for the disc drive 100. Numerous details of construction are not included in the following description because they are well known to a skilled artisan and are unnecessary for an understanding of the present invention.

Mounted to the base 102 is a motor 106 to which one or more discs 108 are stacked and secured by a clamp ring 110 for rotation at a high speed in direction 111. Where a plurality of discs 108 are stacked to form a disc stack, adjacent discs 108 are typically separated by a disc spacer (not shown). An actuator 112 pivots around a pivot bearing 115 in a plane parallel to the discs 108. The actuator 112 has actuator arms 116 (only one shown in FIG. 1) that support load arms 118 in travel across the discs 108 as the actuator arms 116 move within the spaces between adjacent discs 108. The load arms 118 (or "flexures") are flex members that support data transfer members, such as read/write heads 120 ("heads"), with each of the heads 120 operatively interfacing one of the discs 108 in a data reading and writing relationship. This relationship is maintained by a slider (see below) having an aerodynamic surface which operably supports the head 120 on an air bearing sustained by air currents generated by the spinning discs 108. Data read and write signals are transmitted from the head 120 to a preamplifier 121 by electrical traces (not shown) extending along the actuator 112.

Each of the discs 108 has a data storage region comprising a data storage surface 122 divided into concentric circular data tracks (not shown). Each of the heads 120 is positioned adjacent a desired data track to read data from or write data to the data track. The data storage surface 122 can be bounded inwardly by a circular landing zone 124 where the heads 120 can come to rest against the respective discs 108 at times when the discs 108 are not spinning. Alternatively, the landing zone can be located elsewhere.

The actuator 112 is positioned by a voice coil motor (VCM) 128 comprising an electrical coil 130 and a magnetic circuit source. The magnetic circuit source conventionally comprises one or more magnets supported by magnetic poles to complete the magnetic circuit. When controlled current is passed through the actuator coil 130, an electromagnetic field is set up which interacts with the magnetic circuit causing the actuator coil 130 to move. As the actuator coil 130 moves, the actuator 112 pivots around the pivot bearing 115, causing the heads 120 to travel across the discs 108.

The motor 106 spins the discs 108 at a high speed as the head 120 reads data from and writes data to the data storage surface 122. The kinetic energy of the spinning discs 108 transfers through the boundary layer at the disc/air interface, thereby inducing a rotational force component to air currents, and centrifugal force imparts a radial force component to air currents, creating a generally outwardly spiraling airstream.

Figure 2:
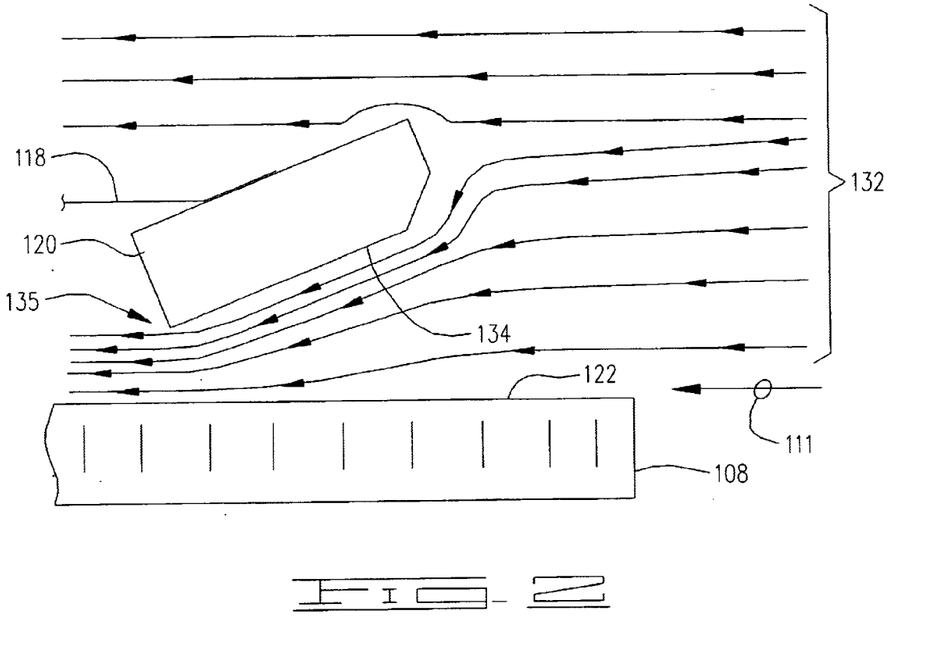
FIG. 2 is a diagrammatic elevational view of the slider of FIG. 1 flying above the data storage surface during static conditions.

FIG. 2 is a diagrammatic elevational view of one of the read/write heads 120 flying spatially disposed from the data storage surface 122 upon a portion of the air currents 132 that engage against an air bearing surface 134 ("slider") of the head 120. The aerodynamic characteristics of the slider 134 and the velocity of the spinning discs 108 are some of the factors considered in order to operatively fly the head 120 in a desired spatial disposition from the data storage surface, separated therefrom by a desired gap 135. These factors and others are utilized in developing theoretical fly heights. The radial position of the head 120 is a factor as well, because the air currents 132 generally increase at the outer portions of the disc 108 where the linear velocity is relatively greater.

Figure 3:
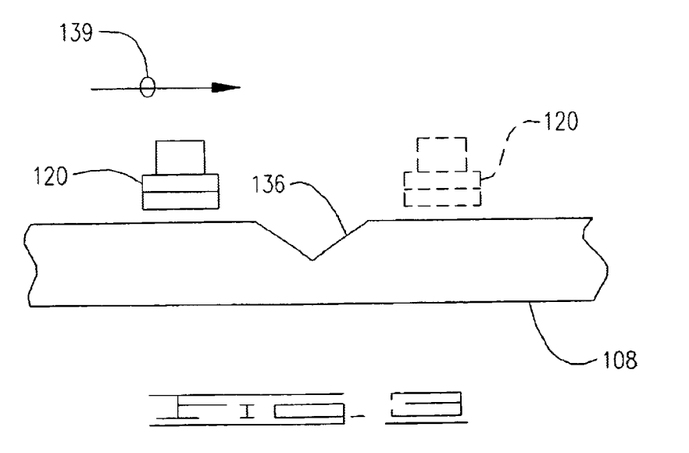
FIG. 3 is a diagrammatic end view of the slider of FIG. 2 being moved radially to encounter a perturbation in the form of a protuberance in the data storage surface so as to invoke a dynamic response in the slider.

Although the data storage surface 122 in FIG. 2 is diagrammatically represented as planar, it is well known that surface irregularities impart a nominal oscillation to the head 120 under static read/write conditions. Embodiments of the present invention, however, contemplate the functional interrelationship between the static fly height of the head 120 and the dynamic response of the head 120 to a known perturbation in the flight path of the head 120. As shown in FIG. 3, in one embodiment the data storage disc 108 can be provided with one or more grooves 136 at selected radial positions of the disc 108, such as one each at the inner-diameter, mid-diameter and outer-diameter. As the head 120 is moved radially in direction 139 it crosses over the groove 136 and exhibits a dynamic response to a differential airstream pressure acting on the slider 134.

Figure 4:
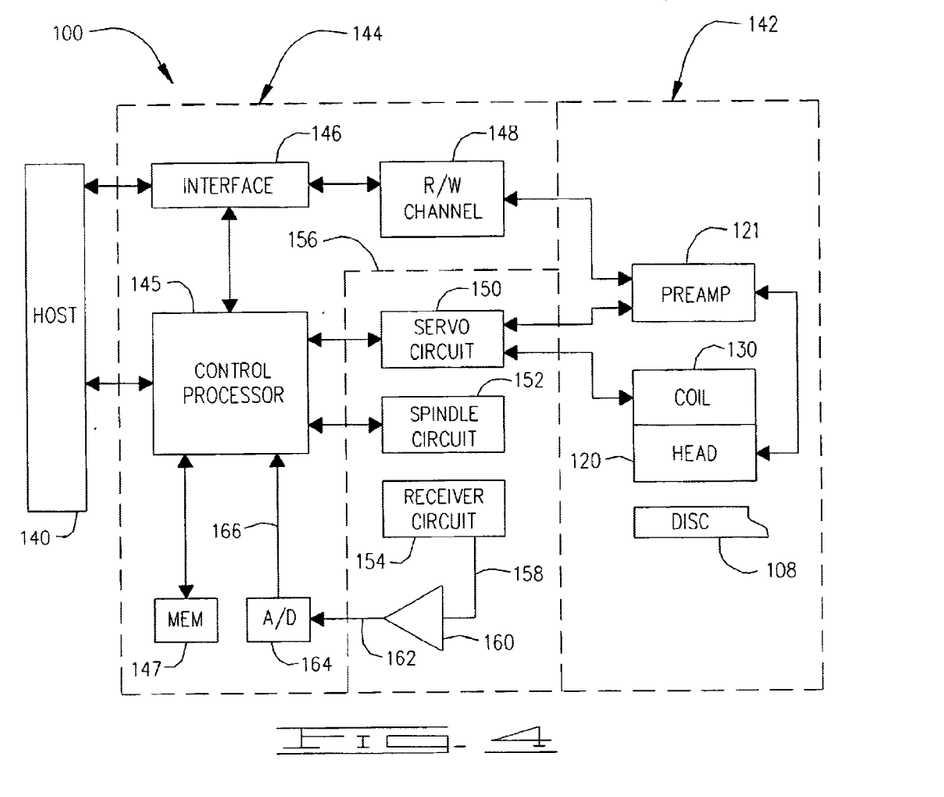
FIG. 4 is a block diagram of the data storage device of FIG. 1.

FIG. 4 is a block diagram of the disc drive 110 of FIG. 1 operably coupled to a host computer 140. The functional circuits are grouped to illustrate the disc drive 110 comprising a head disc assembly (HDA) 142 which generally comprises the mechanical components shown in FIG. 1. A fly height detector apparatus constructed in accordance with an embodiment of the present invention is represented generally by reference number 144.

The fly height detector 144 has control processor 145 providing top level control of the operation of the disc drive 100. Programming and information utilized by the control processor 145 are provided in memory device 147, including a dynamic random access member (DRAM) device and a flash member device. The memory device structure can vary depending upon the requirements of a particular application of the disc drive 100.

An interface circuit 146 includes a data buffer and a sequencer for directing the operation of the disc drive 110 during data transfer operations. Generally, during a data write operation a read/write channel 148 encodes data to be written to the disc 108 with run-length limited (RLL) and error correction codes (ECC). Write currents corresponding to the encoded data are applied by the preamp driver circuit 121 to the head 120 in order to selectively magnetize the disc 108. During a data read operation, the preamp driver circuit 121 applies a read bias current to the head 120 and monitors the voltage across a magneto-resistive (MR) element of the head 120, which varies according to the selective magnetization of the disc 108. The voltage is preamplified by the preamp driver circuit 121 to provide a read signal to the read/write channel 148 which decodes the stored data and provides the same to the buffer of the interface circuit 146, for subsequent transfer to the host computer 140.

A servo circuit 150 controls the position of the head 120 through servo information read by the head 120 and provided to the servo circuit 150 by way of the preamp driver 121. The servo information indicates the relative position of the head 120 with respect to a selected track on the disc 108. In response to the servo information, a digital signal processor controls the application of the current to the coil 130 in order to adjust the position of the head 120 to a desired location. A spindle circuit 152 controls the rotation of the discs 108 through back electromagnetic force (bemf) commutation of the spindle motor 106.

A receiver circuit 154 is integrated into a control circuit 156 in an application specific integrated circuit (ASIC) which comprises at least portions of the servo circuit 150 and the spindle circuit 152, to detect the dynamic frequency response of the slider 134, especially in regard to a known perturbation, and to responsively control the data reading and writing operations to protect stored data. Generally, the receiver circuit 154 comprises a sensor monitoring the dynamic frequency of the slider 134. In one embodiment the receiver circuit comprises a piezoelectric ("PZT") sensor outputting an analog acoustic emissions (AE) measurement on signal path 158 to a driver circuit 160 which amplifies the acoustic emissions signal and provides the same on signal path 162 to an analog to digital (A/D) converter 164 operably coupled to the control processor 145 by signal path 166, so that the control processor 145 has access to a digital representation of the acoustic emissions signal provided by the receiver circuit 154. This signal to the control processor 145 is indicative of the dynamic frequency of the slider 134.

Figure 5:
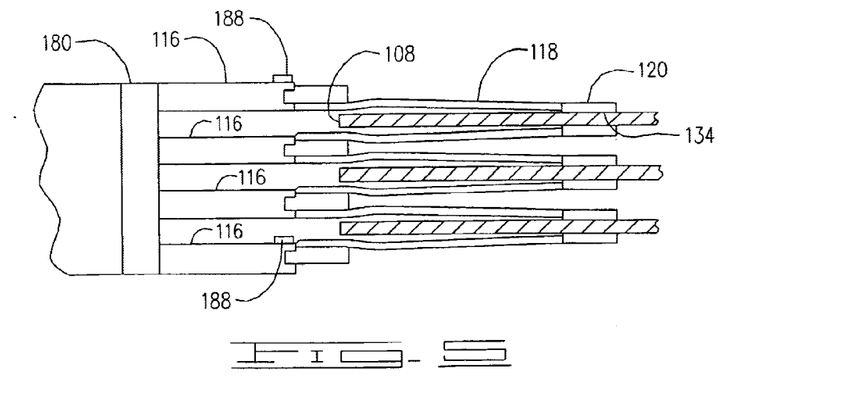
FIG. 5 is a partial cross sectional view of the actuator of the disc drive of FIG. 1.
Figure 5A:
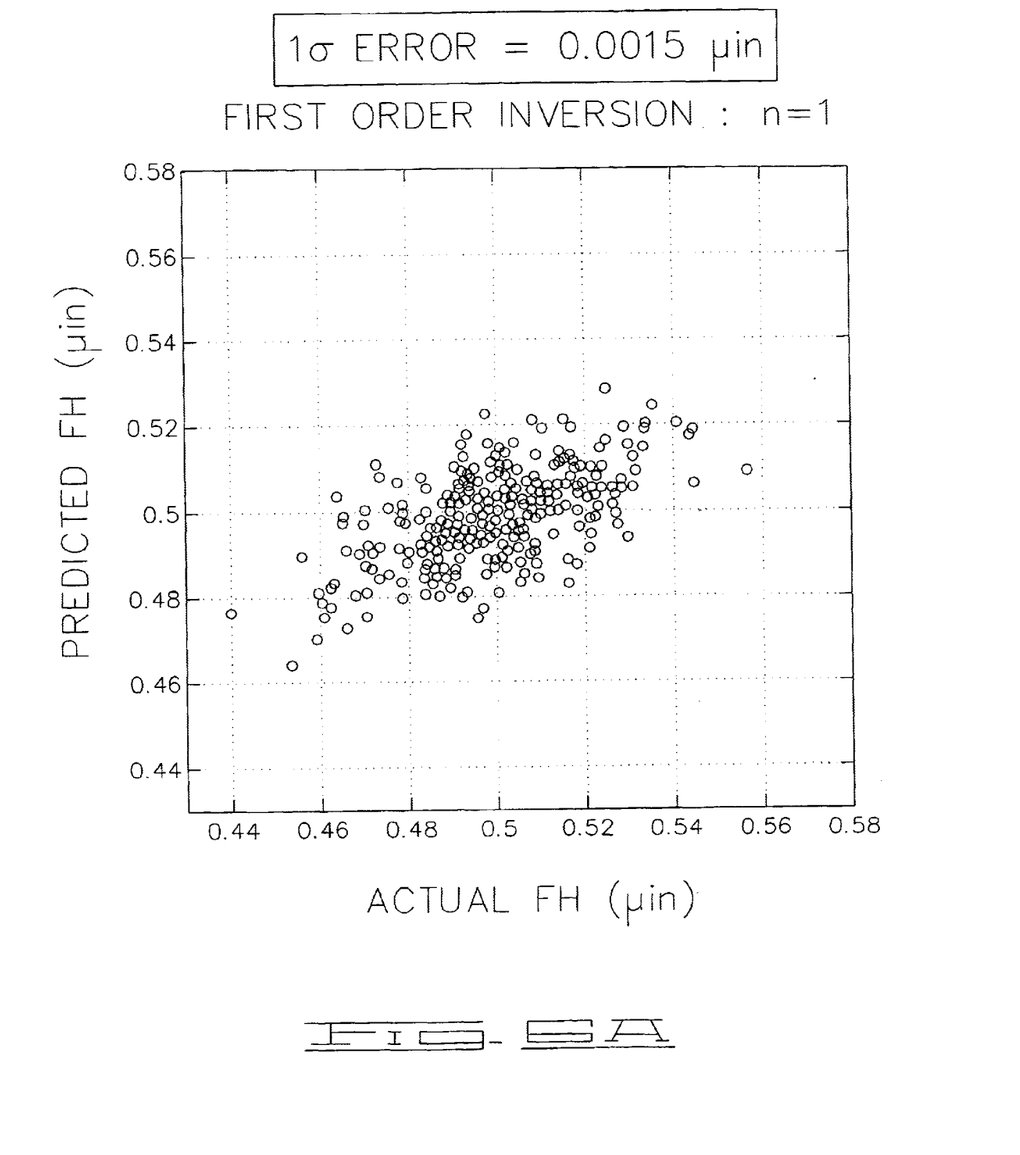
Figure 5B:
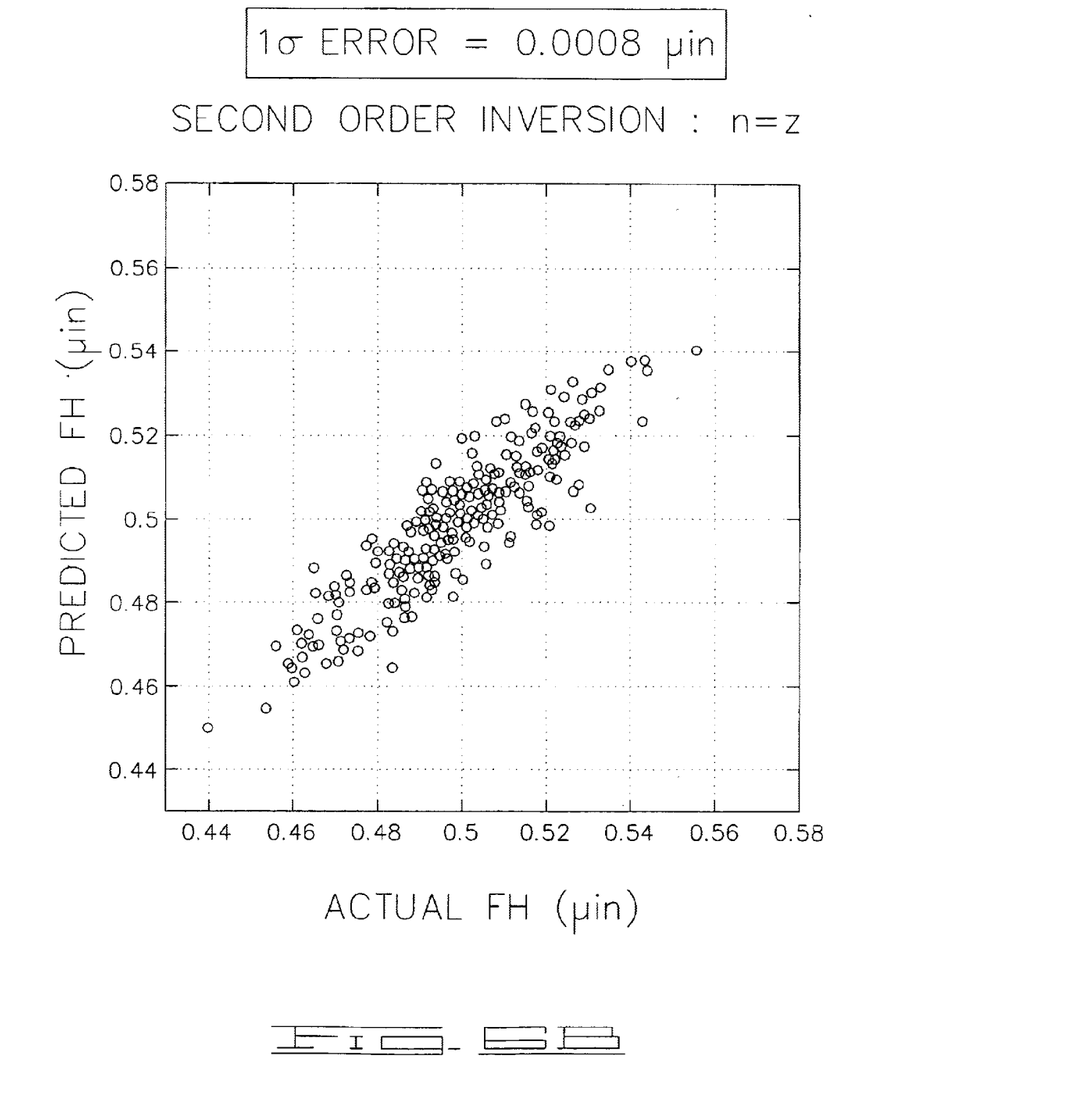

The receiver circuit 154 can be arranged to detect the dynamic frequency of each of the individual sliders 134 within a disc stack. Accordingly, as shown in FIG. 5 an AE sensor 188 can be connected to a particular arm 116 of the actuator 112 so as to indicate the dynamic frequency of the respectively supported slider 134.

The control processor 145 responsively derives a fly height by accessing a numerical model stored in memory 147. In one embodiment the numerical model first contemplates the change in fly height (from nominal) for a particular slider 134 in relation to deviations of one or more sensitivity parameters from nominal values. The sensitivity parameters include physical elements of construction, for example, the amount of crown, camber, PSA, RSA, x_load, y_load, preload, alumina recession, step depth and cavity depth are examples of ten different sensitivity parameters. For n trials associated with these different sensitivity parameters this relationship defining the change in fly height can be expressed as:

$$\Delta F^{(n)} = \frac{\partial F^{(n)}}{\partial \alpha_1} \Delta \alpha_1 + \frac{\partial F^{(n)}}{\partial \alpha_2} \Delta \alpha_2 + \ldots \tag{1}$$

where n=number of trials;
F=fly height; and
α=deviation of sensitivity parameter.
This can be summarized in matrix form as follows:

$$\overrightarrow{\Delta F} = \underline{A} \overrightarrow{\Delta \alpha} \tag{2}$$

where A=matrix of partial derivatives.
Similarly, for n trials the slider dynamic frequency can be expressed in relation to deviations of one or more sensitivity parameters as follows:

$$\Delta \phi^{(n)} = \frac{\partial \phi^{(n)}}{\partial \alpha_1} \Delta \alpha_1 + \frac{\partial \phi^{(n)}}{\partial \alpha_2} \Delta \alpha_2 + \ldots \tag{3}$$

where φ=slider frequency.
This can be summarized in matrix form as follows:

$$\overrightarrow{\Delta \phi} = \underline{B} \overrightarrow{\Delta \alpha} \tag{4}$$

where B=matrix of partial derivatives.

Finally, by eliminating the vector Δα from each equation, we can predict the fly height deviations as a function of the frequency deviations as follows:

$$\overrightarrow{\Delta F} = \underline{A} \, \underline{B}^{-1} \overrightarrow{\Delta \phi} \tag{5}$$

From the above, for consideration of N sensitivity parameters, by doing a number of trial measurements a numerical model can be created correlating fly height to dynamic response. As the number of measurements n approaches the number of parameters N, the error approaches zero. This is illustrated by scatter diagrams 6A and 6B which show the relatively more accurate numerical model of a second order inversion from two measurements (FIG. 6B), as compared to a first order inversion from only one measurement (FIG. 6A). Common curve fitting methods such as a least squares fit can be used to provide an empirically determined numerical model between fly height and frequency. This numerical model can be stored in memory 147 and recalled by the control processor 145 to derive a fly height for a particular measured dynamic frequency.

In a simpler derivation a linear model is assumed for the interrelationship between fly height and dynamic response. For example, if dynamic response measurements are made of the slider 134 in response to perturbations placed at multiple spots on the disc, such as the inner-diameter, mid-diameter and outer-diameter, then the linear numerical model for the inner-diameter fly height is:

$$F_{ID} = A\phi_{ID} + B\phi_{MD} + C\phi_{OD} \tag{6}$$

where A, B and C are determined by doing a least squares fit to the modeled frequencies and fly heights. Given this linear numerical model, as above the receiver circuit 154 measures a dynamic response to the perturbation at the inner diameter and the control processor derives a fly height.

Figure 7:
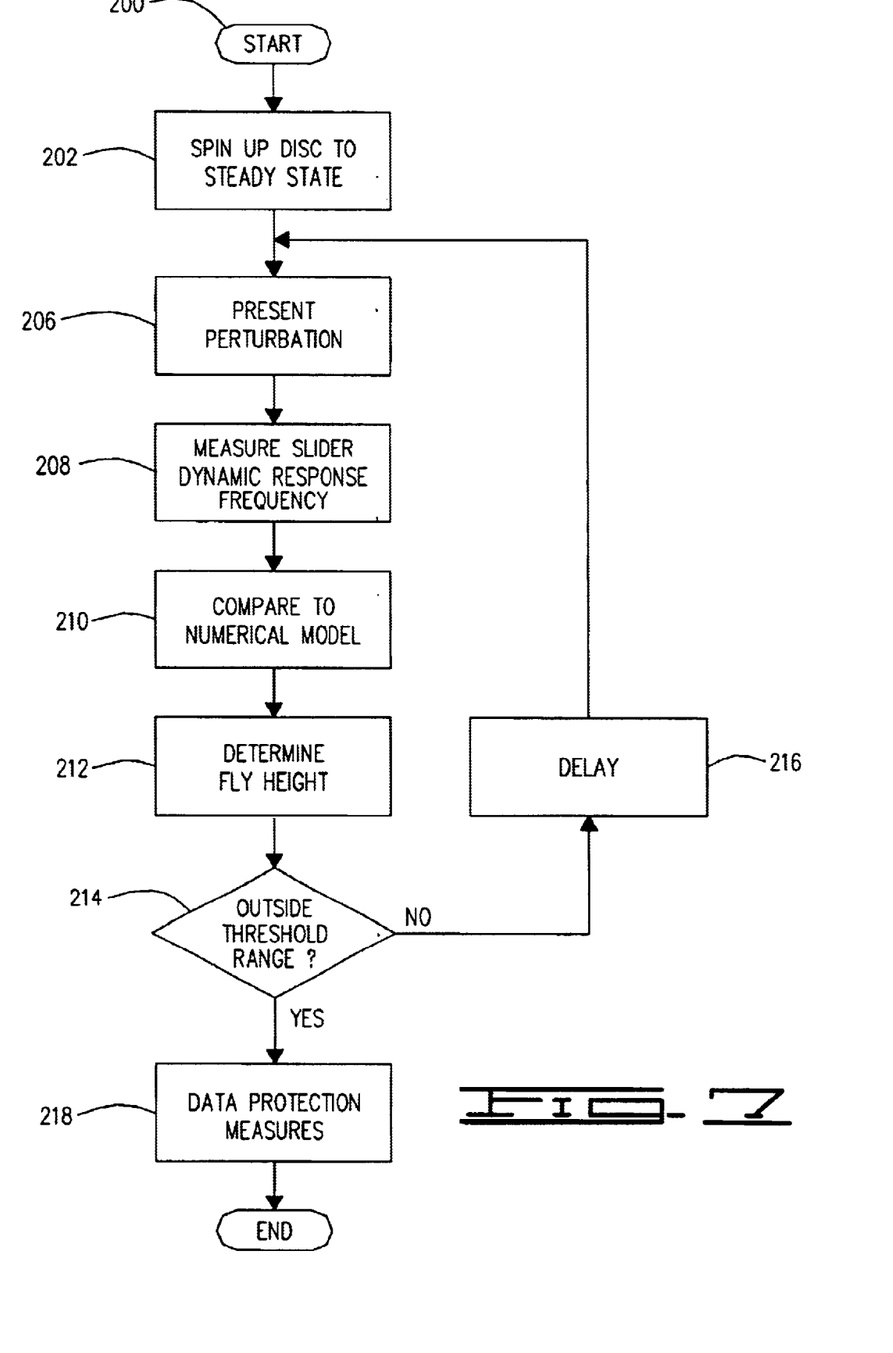
FIG. 7 is a flow chart of a method for determining fly height in accordance with an embodiment of the present invention.
Figure 11:
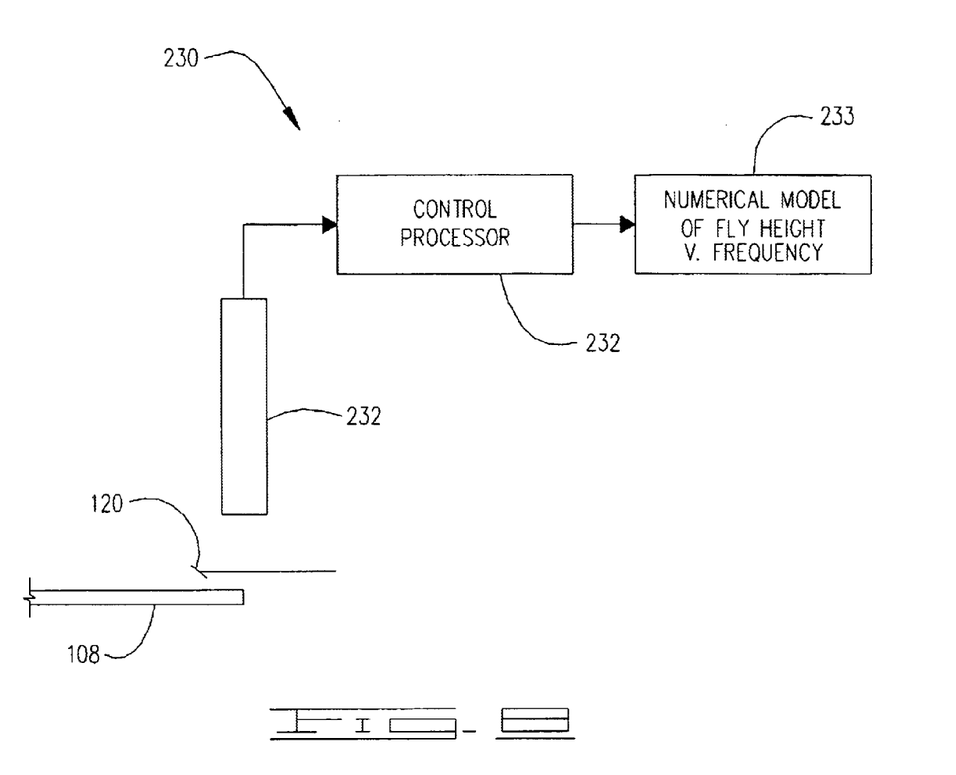

One aspect of the embodiments of the present invention comprises a method for determining the fly height of a read/write device spatially disposed from a data storage surface. FIG. 7 illustrates a method in accordance with an embodiment of the present invention beginning at block 200. At block 202 the data storage disc 108 is started and accelerated to achieve a steady speed, generating air currents supporting the slider 134 at a substantially static fly height defining a gap between the slider 134 and the data storage surface 122. At block 206 a perturbation of preselected magnitude is presented in the gap 135 between the slider 134 and the data storage surface 122, invoking an oscillation in the slider 134. As stated previously in one embodiment the inherent waviness of the disc 108 suffices to provide the perturbation. In another embodiment one or more physical features such as grooves 136 (FIG. 3) are provided for the perturbation. At block 208 the sensors measure the dynamic frequency of the slider 134 in response to the perturbation of block 206. At block 210 the dynamic frequency is compared to a numerical model correlating fly height to slider frequency. At block 212 the fly height is derived from the numerical model of block 210.

At block 214 the fly height from block 212 is compared to a preselected threshold range. If the fly height from block 212 is within the range, then control passes to a delay 216, which after a preselected interval passes control back to block 204 to instigate another fly height determination sequence. If the fly height 212 is not within the range, then control passes to block 218 which initiates data protection measures. These measures can include marking and recording the instances of fly heights below the threshold range where a slider 134 touch down is likely. Further protective measures can be backing up data and shutting down the disc drive 100 to prevent an imminent head crash. These more stringent latter protective measures can be implemented upon accumulation of a selected number of low fly height readings to reduce the occasion of nuisance warnings or shut downs. These data protection measures can further include data rewriting routines where it is indicated that the fly height is greater than the threshold range.

The description above contemplates an embodiment of the present invention as a portion of a data storage device such as disc drive 100. In an alternative embodiment as shown diagrammatically in FIG. 8 a bench top fly height tester 230 apparatus is contemplated. Such a tester 230 can be used in design of new components and testing. The tester 230 comprises a control processor 232 which stores and accesses the empirically determined numerical model 233 of fly height as it relates to dynamic response of the slider 120. The control processor 232 can be simplified because the disc drive 110 control circuits, such as the interface 146, R/W channel 148, servo 150, and spindle 152 circuits are not necessary. Space constraints being not as critical, alternative measurement devices can be used to measure the dynamic response of the slider 134. For example, the tester 230 comprises a laser doppler vibrometer 234 for measuring the dynamic response. The laser doppler vibrometer 234 can be equipped with a quad-cell supplement on the laser apparatus in order to determine the pitch and roll of the slider 134 as well.

In either embodiment contemplated, the disc drive 110 or the tester apparatus 230, other means are contemplated for providing the desired perturbations in alternative embodiments of the present invention. For example, a film of varying thickness can be employed on the disc 108, such as a Langmuir-Blodgett fluid film. In another embodiment, the speed of the rotating disc 108 can be modulated to effect a desired perturbation. Also, the inherent microwaviness of a disc can be used if sufficient to invoke resonance in the slider 134.

In summary, a fly height detector apparatus (such as 144, 230) determines the fly height of the read/write head (such as 120). In an embodiment used within a data storage device (such as 100) the fly height detector preventatively takes data protection measures in response to undesired fly height measurements.

In one embodiment the fly height detector comprises a receiver circuit (such as 154) including one or more sensors (such as 188) that sense acoustic emissions indicative of the dynamic response of the slider portion (such as 134) of the read/write head to a known perturbation.

The sensors are connected to a supporting structure such as an actuator (such as 112). The sensors can be arranged on a unitary portion of the supporting structure to be substantially equally receptive to acoustic emissions from all of the sliders, or can be arranged on individual supporting arms (such as 116) to be substantially more receptive to acoustic emissions from the slider supported by the particular arm.

The fly height detector furthermore comprises a control circuit (such as 156) in the form of an application specific integrated circuit that is responsive to the receiver circuit for adaptively controlling the data reading and writing operations of the head and spindle motor to protect stored data.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the selected numerical model may be based on different numbers of response parameters while maintaining substantially the same functionality without departing from the scope and spirit of the present invention. In addition, although the preferred embodiment described herein is directed to a data storage device, it will be appreciated by those skilled in the art that the teachings of the present invention can be applied to other systems, like data storage test or certification systems, servo track writers, or optical data storage systems, as well as more generally to fluid film bearings such as but not limited to tilting pad thrust bearings, industrial bearings, journal bearings and hydrodynamic bearings where clearance and natural frequency are related, without departing from the scope and spirit of the present invention.

What is claimed is:

1. A fly height detector apparatus for detecting the fly height of a read/write head spatially disposed from a data storage surface during a data transfer operation, the data storage surface moving relative to the read/write head generating air currents supporting the read/write head at a fly height defining a gap between the read/write head and the data storage surface, the fly height detector apparatus comprising:

a receiver circuit measuring a steady-state oscillation frequency of the read/write head;

a perturbation deliverable to the gap between the read/write head and the data storage surface to invoke a dynamic response in the read/write head; and a processor circuit responsive to the receiver circuit to derive the fly height in relation to the dynamic response frequency.

2. The fly height detector apparatus of claim 1 wherein the processor circuit comprises a memory in which is stored a numerical model describing a functional interrelationship between the fly height and the read/write head dynamic response frequency.

3. The fly height detector apparatus of claim 1 wherein die receiver circuit comprises a laser doppler vibrometer measuring the dynamic response frequency of the read/write head.

4. The fly height detector apparatus of claim 1 wherein the receiver circuit comprises a piezoelectric sensor monitoring the dynamic response frequency of the read/write head.

5. The fly height detector apparatus of claim 1 wherein the perturbation comprises a groove extending from the data storage surface away from the gap.

6. The fly height detector apparatus of claim 1 wherein the perturbation comprises a film of varying thickness on the disc.

7. The fly height detector apparatus of claim 1 wherein the perturbation comprises a selected change in speed of the data storage surface.

8. A method for detecting a fly height of a read/write head spatially disposed from a data storage surface during a data transfer operation, comprising:

moving the data storage surface at a substantially steady speed, generating air currents supporting the read/write head at a substantially static fly height defining a gap between the read/write head and the data storage surface;

measuring the read/write head steady-state oscillation frequency associated with the static fly height;

presenting a perturbation in the gap between the road/write head and the data storage surface, invoking an-oscillation dynamic response in the read/write head;

measuring a dynamic response frequency of the read/write head to the perturbation;

comparing the dynamic response frequency to a numerical model of fly height in relation to read/write head oscillation frequency; and deriving the fly height of the read/write head from the numerical model.

9. The method of claim 8 wherein the comparing the dynamic response frequency eement comprises accessing a memory-stored algorithm defining a functional interrelationship between the fly height and the read/write head oscillation frequency.

10. The method of claim 8 wherein die measuring the read/write head oscillation frequency element comprises using a device characteristic of a laser doppler vibrometer.

11. The method of claim 8 wherein the measuring the read/write head oscillation frequency element comprises using a device characteristic of a piezoelectric sensor.

12. The method of claim 8 wherein the presenting a perturbation element comprises moving a groove extending from the data storage surface.

13. The method of claim 8 wherein the presenting a perturbation element comprises moving a portion of the disc comprising a film layer extending from the data storage surface.

14. The method of claim 8 wherein the presenting a perturbation element comprises selectively changing the speed of the data storage surface.

15. A disc drive, comprising:

a rotating data storage disc generating air currents sustaining a read/write head at a fly height defining a gap therebetween during data transfer operations; and means for detecting the fly height in relation to a dynamic response frequency of the read/write head to a known perturbation introduced in the gap.

16. The disc drive of claim 15 wherein the means for detecting comprises a memory in which is stored an algorithm defining a functional interrelationship between the fly height and a read/write head oscillation frequency.

17. The disc drive of claim 15 wherein the means for detecting comprises a laser doppler vibrometer measuring the dynamic response frequency of the read/write head to the perturbation.

18. The disc drive of claim 15 wherein the means for detecting comprises a piezoelectric sensor measuring the dynamic response frequency of the read/write head to the perturbation.

19. The disc drive of claim 15 wherein the means for detecting comprises a perturbation comprising a groove extending from the data storage disc.

20. The disc drive of claim 15 wherein the means for detecting comprises a perturbation comprising a film layer extending from the data storage surface disc.

21. The disc drive of claim 15 wherein the means for detecting comprises a perturbation comprising a selected change in speed of the data storage surface disc.

* * * * *